March 3, 1942.  M. G. DYSTHE  2,274,891
MACHINE FOR CLEANING SMALL MACHINE PARTS
Filed July 24, 1939  2 Sheets-Sheet 1
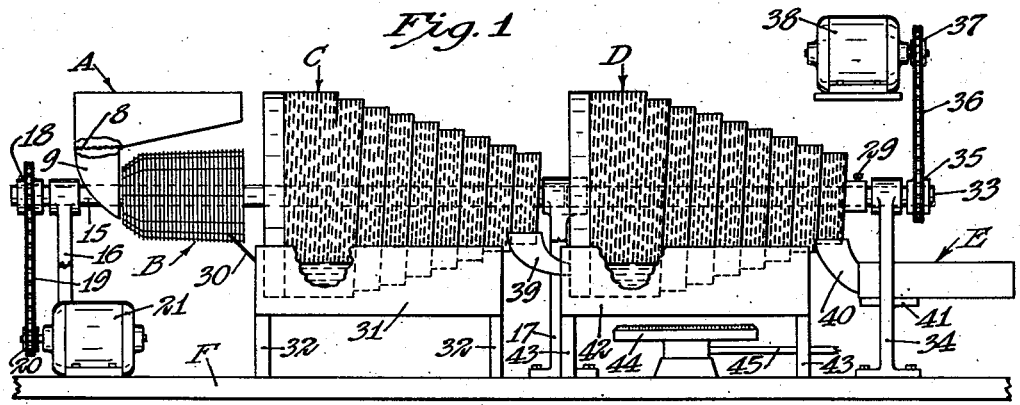
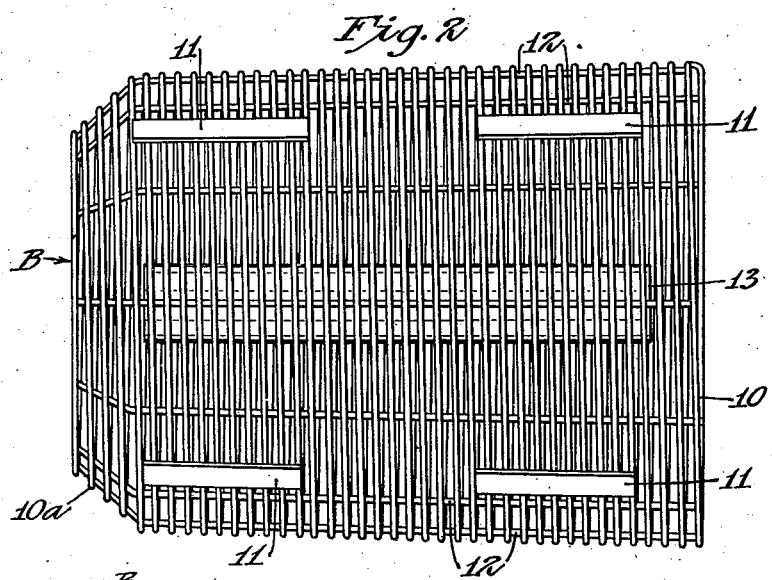
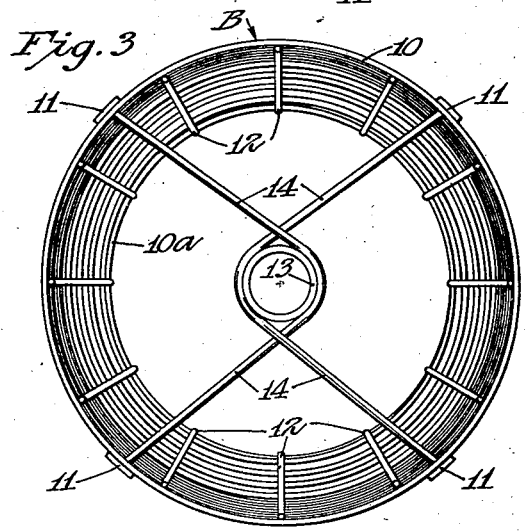
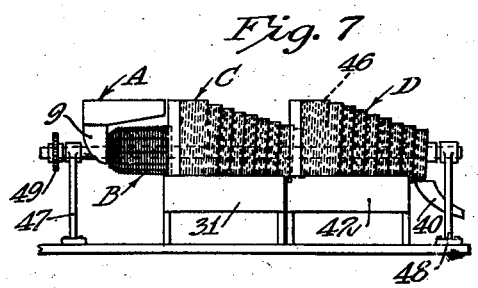
Inventor
Martinius G. Dysthe
By Williamson & Williamson
Attorneys

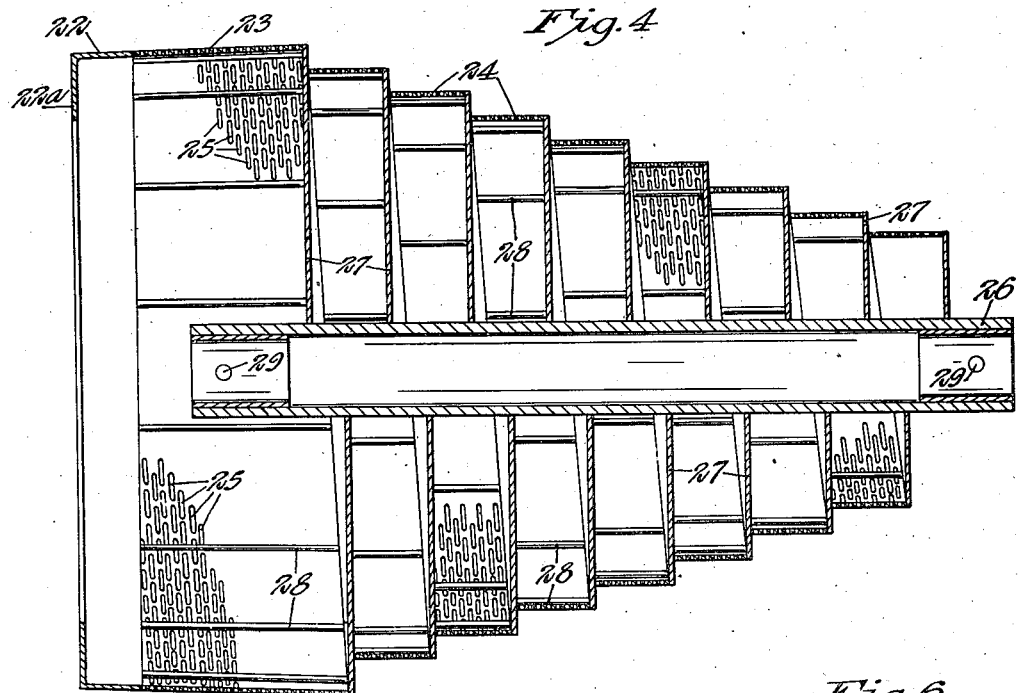
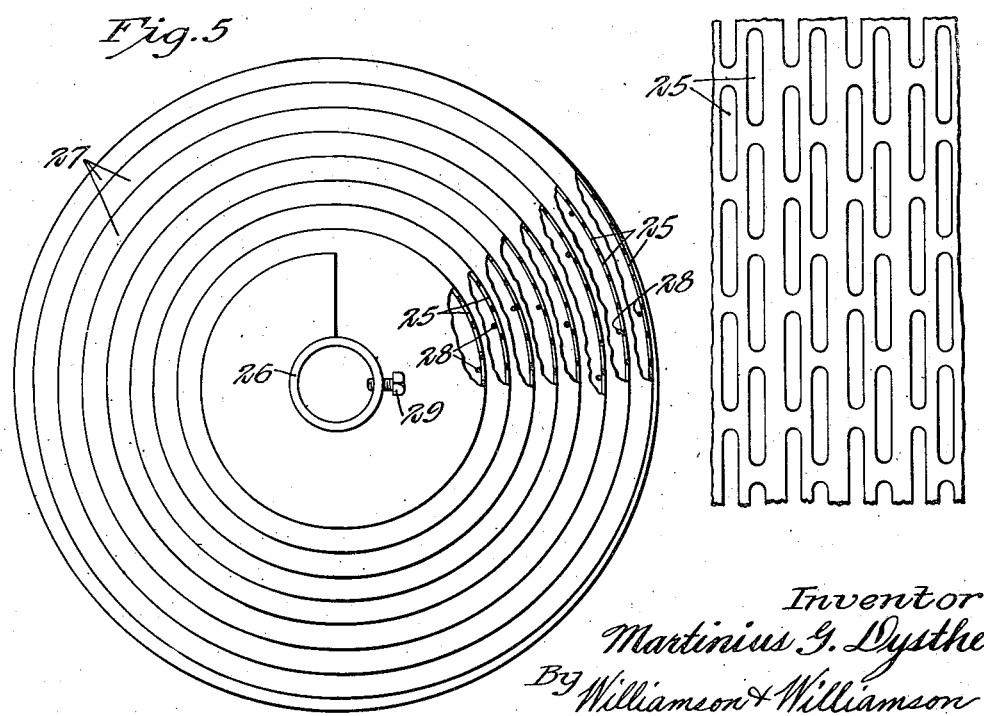

Patented Mar. 3, 1942

2,274,891

UNITED STATES PATENT OFFICE 2,274,891

MACHINE FOR CLEANING SMALL MACHINE PARTS

Martinius G. Dysthe, Minneapolis, Minn.

Application July 24, 1939, Serial No. 286,093

1 Claim. (Cl. 141—1)

This invention relates to machines for cleaning objects and particularly to a machine for cleaning small machine made metal parts.

Small metal parts made on automatic screw machines or other machine tools are usually taken from the machines in quantities mixed with metal shavings and covered with lubricant and chips and grains of metal. Considerable work is usually involved in rendering the parts clean and dry.

A general object of my invention is to provide, in a single machine, means for effectively and efficiently removing lubricant and metal shavings, chips and grains from small metal parts with a minimum expenditure of time and effort on the part of a person operating the machine.

Another object is to provide such a machine wherein the parts being cleaned are automatically carried by gravity from one to another of respective portions of the machine which perform successive operations on the parts.

Yet another object is to provide such a machine wherein rotating members in respective portions of the machine may be disposed at a common level and rotate about a common axis and yet enable delivery by gravity of parts to be cleaned from one portion to another of the machine.

Still another object is to provide in such a machine a simple device for simultaneously tumbling, washing, and elevating parts to be cleaned.

A further object is to provide such a device so constructed as to be operable to either pass parts therethrough at a normal rate or to retain parts therein for any desired extended period of time.

A still further object is to provide such a machine of simple, compact, rugged and inexpensive construction.

These and other objects and advantages of the invention will more fully appear from the following description made in connection with the accompanying drawings, wherein like reference characters refer to the same parts throughout the views, and, in which:

Fig. 1 is a general side view of an embodiment of my invention;

Fig. 2 is a side view of a portion of the machine of Fig. 1 drawn to enlarged scale;

Fig. 3 is an end view of the structure of Fig. 2 as viewed from the right.

Fig. 4 is a longitudinal sectional view of another portion of the machine of Fig. 1 drawn to enlarged scale;

Fig. 5 is an end view of the structure of Fig. 4 as viewed from the right;

Fig. 6 is a detail view; and

Fig. 7 is a general side view of another form of my machine drawn to reduced scale.

Referring to the drawings, the illustrated embodiment of my invention includes a tray A for receiving parts covered with lubricant and metal chips and particles, and mixed with metal shavings of various lengths, this tray being provided with means for screening long shavings from the parts, a tumbler drum B for removing metallic particles, chips and relatively short shavings from the parts, a second tumbler drum C and associated apparatus for removing any remaining metallic particles and washing the parts in a solvent for removing lubricant, a third tumbler drum D and associated apparatus for washing solvent from the parts and drying the parts, and a tray E for receiving parts which have been cleaned and dried in the preceding portions of the machine.

The tray A may consist of a shallow box a portion 8 of the floor of which is formed of wire mesh or screen or the equivalent having interstices of such dimensions as to pass the parts to be cleaned and yet impede passage therethrough of at least a majority of the metallic shavings which are usually mixed with small machine made parts.

A chute 9 is suitably attached to the lower side of the tray A to receive parts falling through the reticulated floor portion 8 and deliver the received parts into the parts receiving end of the interior of the first tumbler unit B. The chute 9 may be constructed of suitable material such as sheet metal and is curved downwardly and to the right as indicated in Fig. 1.

The first tumbler B is open at both ends to provide a parts inlet and a parts outlet at respectively the left and right ends thereof and consists of a reticulated tubular member 10 which is slightly tapered to have a somewhat larger diameter at its outlet end than at its inlet end and is provided, at its inlet end with an annular flange 10a projecting convergently outwardly of the inlet end of the member 10 and toward the axis of the member 10. I find it convenient and economical to construct the member 10 and flange 10a of rod stock or relatively heavy wire helically coiled, as indicated in Figs. 2 and 3, with the diameter varied to obtain the desired shape illustrated in Figs. 2 and 3 and described above. To interconnect the turns of the wire from which the member 10 and flange 10a are formed for the purpose of rigidifying the structure and for other purposes to be explained, straps 11 are placed on the exterior of the member 10, and rods 12 are placed on the interior of the member 10 and flange 10a. The straps 11 and rods 12 are secured to the helically bent wire forming the structure at preferably all points of contact therewith by suitable means such as welding or the like. The straps 11 extend substantially parallel to the axis of the member 10 with each strap 11 spanning a substantial number of turns of the wire forming the member 10, as shown in Fig. 2. The straps 11 are disposed in respective groups thereof located near respective ends of the member 10, the straps 11 of each group being spaced circumferentially of the member 10 as shown. The rods 12 extend lengthwise of the member 10 substantially parallel to the axis thereof and circumferentially spaced apart relative to the member 10. The left-hand ends of the rods 12 are extended along the inner periphery of the flange 10a to the outer edge thereof.

Means is provided for supporting the tumbler drum B for rotation about the longitudinal axis thereof. This means may include a hollow shaft 13 disposed coaxially of the member 10 and spokes 14 extending between the shaft 13 and the straps 11 and suitably secured to the shaft 13 and straps 11 by suitable means such as by welding or the like. I have found it convenient to form respective pairs of the spokes 14, as shown in Fig. 3, by bending rods into a general V-shape at the apex of which is a curved portion extending arcuately about the shaft 13 through a few angular degrees, the free ends of the bent rods being secured to the straps 11.

For support of the hollow shaft 13 and the member 10, a shaft 15 is provided on the left-hand portion of which the hollow shaft 13 is snugly telescoped and secured by suitable means. The respective ends of the shaft 15 are journalled in upstanding bearing brackets 16 and 17 which are mounted on a suitable base such as a floor F. It is to be noted that the right-hand end of the shaft 15 extends only to the medial portion of the bearing of the bearing bracket 17. The left-hand end of the shaft 15 is provided with a sprocket 18 connected by a sprocket chain 19 to a sprocket 20 carried by a source of rotary mechanical power such as the electric motor 21.

The lower end of the spout 9 of the parts receiving tray A projects into the interior of the parts inlet opening defined by the flange 10a of the tumbler drum B so as to deliver parts into the left-hand end of the interior of the tumbler drum B. During rotation of the drum B, this rotation being at a relatively low speed, parts therewithin will stay in the lower portion of the drum B responsive to gravity and hence will tend to slide or roll on the interior periphery of the drum B. The rods 12 on the inner periphery of the drum B constitute inwardly protruding longitudinal ribs which will be encountered by any parts which tend to slide rather than roll and will cause such parts to bounce and turn over. Constant agitation of parts within the drum B will shake metallic chips and particles from the parts whereupon such dislodged chips and particles will drop from the drum B through the interstices thereof. The drum is, of course, so constructed that the interstices will be small enough to prevent dropping of parts therethrough. Due to the taper of the member 10, rotation of the drum B and the effect of gravity will obviously cause gradual shifting of parts within the drum B to the right to finally fall from the lower portion of the parts outlet formed by the open right-hand end of the member 10. The parts discharged from the tumbler B will still be coated with lubricant to which a few small metallic particles are adhering.

Removal of the lubricant and remaining small metallic particles from the parts is effected in the second tumbler drum C which will be described.

The tumbler drum C includes at its left-hand end an annular band 22 carrying at its left-hand edge an annular inwardly projecting flange 22a. To the right of the band 22 is a wider band 23 slightly increasing in diameter toward the right. The band 22 is joined along its respective edges to adjoining edges of the flange 22a and band 23. The bands 22 and 23 encircle a space constituting a parts receiving chamber of approximately cylindrical shape and the flange 22a defines an opening constituting a parts inlet. A third band 24, considerably narrower than the band 23 and disposed with its width parallel to the axis of the band 23, starts at its left-hand end flush with the band 23 and joined to the right-hand edge thereof, as indicated in Figs. 1, 4 and 5, and increases from zero width to full width as it continues in a clockwise direction (as viewed from the right of the machine). From the point of attainment of full width thereof the band 24 continues helically to the right (as viewed in Fig. 4) about the axis of the band 23 in a clockwise direction (as viewed from a point to the right of Fig. 4) with continually decreasing radius until the radius has become relatively small compared to the radius of the band 23. The convolutions of the band 24 are so arranged that the left-hand edge of each convolution is substantially axially aligned with the right-hand edge of the preceding convolution.

The bands 23 and 24, which constitute the peripheral portion of the tumbler drum C, are formed of reticulated flat material a piece of which is illustrated in Fig. 6 and is shown as having elongated slots 25 therein.

A hollow shaft 26 for rotatably carrying the tumbler drum C is contained therewithin in co-axial relation with the band 23. A wall 27, secured at its inner edge to the hollow shaft 26 and disposed radially thereof, starts at the right-hand limit of the band 23 and extends helically to the right (as viewed in Fig. 4) in a clockwise direction (as viewed in Fig. 5) in radial alignment with the edges of the band 24, the radius of the outer edge of the wall 27 continually diminishing to be substantially equal to the radius of the portion of the right-hand edge of the helical band 24 adjacent thereto. The outer edge of the helical wall 27 is joined to the right-hand edge of the band 24 throughout the length thereof and the left-hand edge of the band 24 is joined to the right-hand face of the wall 27. The wall 27 obviously constitutes means through which the peripheral portion of the tumbler drum C is rigidly carried by the hollow shaft 26 in co-axial relation therewith.

The band 24, the wall 27 and the hollow shaft 26 together define a helical passage the radius of the outer limit of which continually decreases as the passage progresses to the right. The left-hand end of this passage opens into the parts receiving chamber within the band 23 to constitute an inlet for receiving parts therefrom and the right-hand end of the passage is open to constitute an outlet for discharging parts therefrom.

Preferably, but not necessarily, the wall 27 is formed of imperforate material. Elements 28, which may be formed of wires, rods, or the like, are secured to the inner peripheries of the bands 23 and 24 in circumferentially spaced relation to each other, as shown, to form inwardly protruding longitudinal ribs for causing bouncing and rolling of parts disposed within the tumbler drum when the same is rotating.

The hollow shaft 26 of the tumbler drum C is snugly telescoped onto the right-hand portion of the shaft 15 and is secured thereon against rotation relative thereto by suitable means such as the set screws 29.

A chute 30, shown in Fig. 1, is provided for receiving parts discharged from the outlet of the tumbler drum B and delivering the received parts into the lower portion of the receiving chamber of the tumbler drum C. The discharge end of the tumbler drum B is made somewhat smaller in diameter than the edge of the flange 22a so that parts discharged from the drum B may be carried by gravity into the lower portion of the receiving chamber of the drum C.

If the tumbler drum C is rotated in a counter-clockwise direction (as viewed from a point to the right of Fig. 1), parts within the receiving chamber of the drum C will gravitate to the right due to the slight taper of the annular band 23 and will enter the helical passage of the drum C. Continued rotation of the drum C and the effect of gravity to keep the parts in the lowermost portion of the particular convolution of the helical passage in which the parts are contained will cause the parts to progress to the right in the helical passage and, since the radius of the passage relative to the rotational axis of the drum C continually decreases, the parts will be elevated and will issue from the outlet end of the passage at a level considerably higher than the level at which the parts are placed in the parts receiving chamber of the drum C. This enables the parts to be delivered by gravity from the outlet of the drum C to the inlet chamber of another drum D located co-axially of the drum C.

Means is provided in association with the tumbler drum C whereby parts working through the drum C will be washed in a suitable solvent to remove lubricant and remaining grains of metal therefrom. For this purpose an open topped receptacle 31 is provided and supported from the floor F by supports 32 so that the lower portion of the drum C will depend into the interior of the receptacle 31. With the receptacle 31 filled with a suitable solvent, the lower portion of the tumbler drum C, due to the reticulated construction of the bands 23 and 24, will be flooded with solvent and parts contained in the drum C will be immersed in and tumbled about in the solvent to be thoroughly cleansed thereby of lubricant and any adhering metallic particles.

The parts discharged from the outlet of the tumbler drum C will be entirely clean except for a coating of solvent which may be removed in the third tumbler drum D which is to be described.

The third tumbler drum D may be and preferably is constructed as an identical duplicate of the previously described tumbler drum C and hence need not be separately described. The hollow shaft 26 of the drum D is telescoped onto and secured to a shaft 33 which is axially aligned with and immediately adjacent the right-hand end of the previously described shaft 15. The left-hand end of the shaft 33 is journalled in the right-hand half of the bearing of the bearing bracket 17 and the right-hand end is journalled in the bearing of a bearing bracket 34 mounted on the floor F. The right-hand end of the shaft 33 is provided with a sprocket 35 connected through a sprocket chain 36 to a sprocket 37 carried by a source of rotary mechanical power such as the electric motor 38.

A chute 39 is provided for receiving parts from the outlet of the tumbler drum C and delivering the received parts into the lower portion of the receiving chamber of the tumbler drum D. Another chute 40 is provided for receiving parts from the outlet of the tumbler drum D and delivering them into the parts receiving tray E. A shelf 41 supported from the bearing bracket 34 may be provided to serve as a support for the tray E and the tray E is preferably secured thereto by suitable means.

An open topped receptacle 42, similar to the receptacle 31 previously described, is carried by supports 43 and is associated with the drum D in the same manner as the receptacle 31 is associated with the drum C. Heating means such as the gas burner 44 served by the gas conduit 45 is provided for heating the receptacle 42 and its contents. The receptacle 42 is normally filled with a fluid suitable for cleaning solvent from parts contained within the drum D. Water is suitable for this purpose when heated by the burner 44. The last few convolutions of the helical passage of the drum D are above the level of the liquid in the receptacle 42 and hence parts therein will be dried by evaporation stimulated by the high temperature imparted to the parts by the hot liquid in the receptacle 42.

For a purpose to be explained it is preferable that the electric motors 21 and 38 be motors of a reversible type. If it is desired that parts be subjected to washing action in either of the tumbler drums C and D longer than the length of time provided in normal operation of the machine this may be accomplished by reversing the direction of rotation of the drum involved. As long as reverse rotation is maintained the parts in the reversed drum will remain in the parts receiving chamber of that drum rather than being progressed through the helical passage thereof. When it is desired that the parts move through the drum in a normal manner the normal direction of rotation of the drum is resumed.

The chutes 30, 39 and 40 not only serve to deliver parts by gravity from drum B to drum C, from drum C to drum D, and from drum D to the tray E but also act to deposit the parts more or less gently in the lower portion of the spaces in which they are received so that the parts will not be nicked or dented.

The size of mesh in the screen 8 of the tray A and the distance between successive turns of the helically bent wire forming the peripheral portion of the drum B will, of course, be chosen in accordance with the size of the parts to be handled in the machine. Where parts of various sizes will be handled from time to time it is my intention to provide a series of interchangeable screens 8 of various sizes of mesh and a series of interchangeable drums B having various spacings between turns of the wire forming the peripheral portions thereof.

In cases where independent reversal of the respective drums C and D is not considered essential and the parts to be handled are such that the danger of denting or nicking the same is not a matter of concern, my machine may be simplified as indicated in Fig. 7. In this form of my machine the tumbler drums B, C and D are all mounted on a single shaft 46 instead of the two shafts 15 and 33. The shaft 46 is journalled at its respective ends in bearing brackets 47 and 48 and, at one end, carries a sprocket 49 for driving connections with a source of rotary mechanical power. The drums B, C and D are mounted on the shaft 46 in such relation that the outlet ends of the drums B and C project a short distance into the parts receiving chambers of the respective drums C and D to discharge parts directly thereinto without the need for chutes corresponding to the chutes 30 and 39 of Fig. 1. Fluid receptacles 31 and 42 and an outlet chute 40 may be associated with the drums C and D in the same manner as they are associated therewith in Fig. 1.

Where other than two washing operations, as provided for in the illustrated machine, are desired, the number of drums such as drums C and D may, of course, be chosen in accordance with the number of successive washing operations desired. Where it is desired to treat parts with chemicals as, for example, in preparation for plating of parts, my machine may include for such purpose, a drum such as the drums C and D and a fluid receptacle such as the receptacles 31 and 42 associated therewith and filled with a solution of the chemical to be used. Also a drum such as the drums C and D and an associated fluid receptacle such as the receptacles 31 and 42 may be readily adapted for use in carrying on what is known as the tumbler method of plating.

It is apparent that I have invented a novel, compact, rugged, effective and efficient machine capable of automatically performing successive cleaning operations on small machine made parts without the need for manual handling of parts between successive operations thereon, all movement of parts through the machine being effected with the aid of gravity including elevation of parts in portions of the machine.

It will, of course, be understood that various changes may be made in the form, details, arrangement and proportions of the various parts without departing from the scope of my invention.

What is claimed is:

A combined tumbler drum and object elevating device for entrance and exit of objects at respective ends thereof including a peripheral portion comprising a reticulated flat band having a width normal to radii of said drum, said band extending helically about the rotational axis of said drum with a radius relative to said axis diminishing from the entrance end to the exit end of said drum, a helical wall disposed radially of said axis and joined in its outer portion to mutually nearest edges of adjoining convolutions of said band, and means supporting said drum for rotation about said axis, said axis being disposed horizontally whereby objects may be introduced into the entrance end of said drum at a level below the level at which said objects will be discharged from said exit end.

MARTINIUS G. DYSTHE.